Feb. 10, 1970  D. A. DAMM  3,494,756
METHOD OF MOUNTING A PIN-TYPE ELECTRODE IN A GLASS ARTICLE
Filed March 31, 1967  4 Sheets-Sheet 1

INVENTOR.
DANIEL A. DAMM
BY
E. J. Holler
W. A. Schaich
ATTORNEYS

INVENTOR.
DANIEL A. DAMM
BY
*E.J. Holler*
*W.A. Schaich*
ATTORNEYS

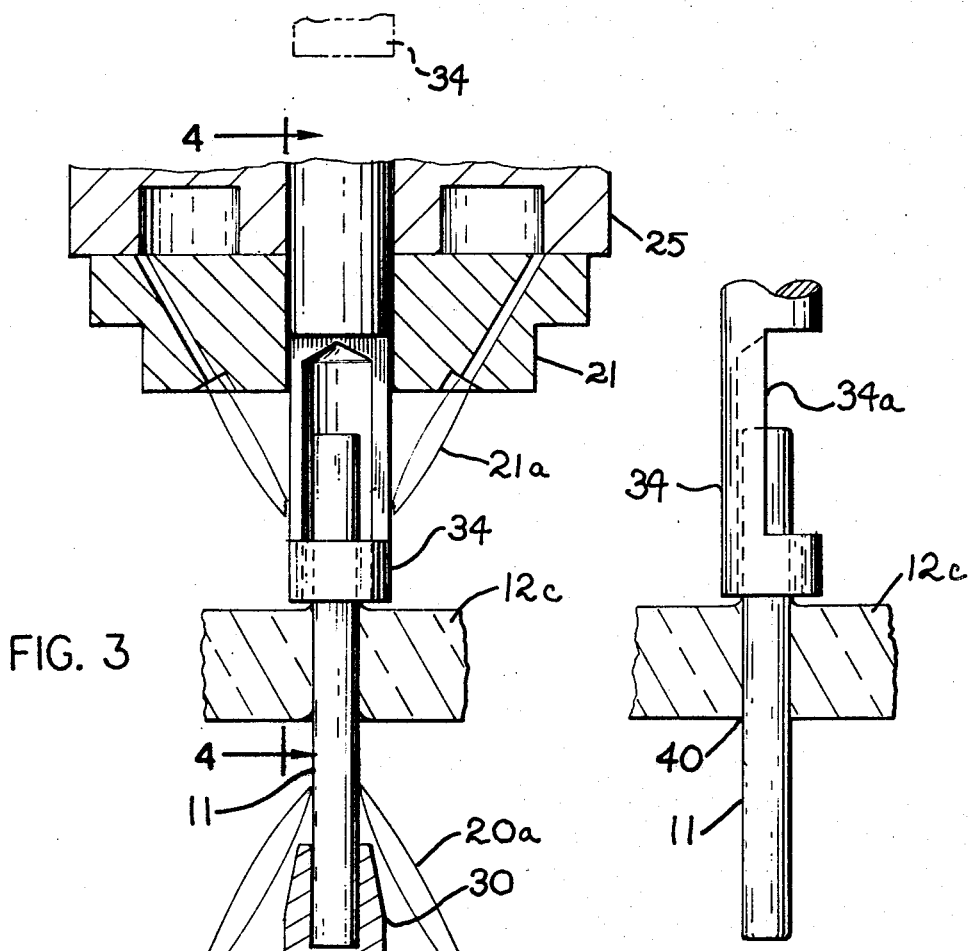
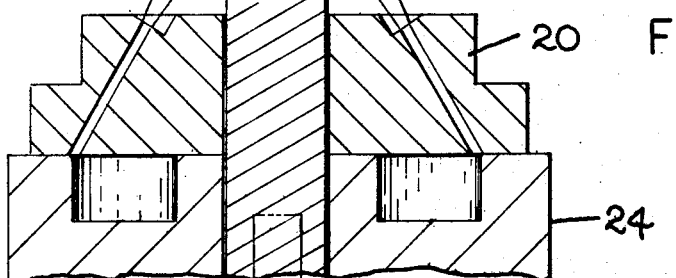

INVENTOR.
DANIEL A. DAMM

United States Patent Office 3,494,756
Patented Feb. 10, 1970

3,494,756
METHOD OF MOUNTING A PIN-TYPE ELECTRODE IN A GLASS ARTICLE
Daniel A. Damm, Toledo, Ohio, assignor to Owens-Illinois, Inc., a corporation of Ohio
Filed Mar. 31, 1967, Ser. No. 627,387
Int. Cl. C03c 27/02, 27/00
U.S. Cl. 65—59                                            6 Claims

ABSTRACT OF THE DISCLOSURE

A method of mounting a metallic pin-type electrode element in vacuum-tight relation in the sidewall of a hollow glass article, such as an electron discharge device. Opposing surfaces of a localized area of a preheated glass article are additionally heated so as to be in heat-softened workable condition. This heating is discontinued so that the opposed surfaces are allowed to cool sufficiently to form a cool-skin condition. The metallic pin member is forcefully impelled through the article sidewall at the localized area without deleterious sidewall glass adhering to its ends. The pin is retained in aligned relation during further heating of the glass-to-metal interface, as well as during final cooling.

---

This invention relates to a method of mounting a metallic element in the sidewall of a glass article and, more specifically, to sealing a metallic pin-type contact member projecting through the article sidewall adapted to conduct electrical current passing between opposing surfaces of the article sidewall.

In the manufacture of cathode-ray picture tubes having essentially all-glass envelopes of the type now generally used in the television industry, the tube envelope is usually provided with a conductive coating on its interior surface which is connected to an electrical circuit disposed exteriorly of the envelope through an electrically-conductive element commonly referred to as an "anode button" which is sealed into the tube sidewall. Mounting of the button is usually performed by first forming an aperture in the glass sidewall of the body or funnel member, and lowering the button thereinto while applying heat to the button and surrounding glass until the button is wetted by the heat-softened workable glass. Application of heat during the sealing-in operation must be carefully controlled and normally the glass immediately surrounding the button sags into an undesirable condition during formation of a durable glass-to-metal vacuum-type seal requiring repositioning of the button and surrounding glass.

Repositioning the anode button in the funnel sidewall has been previously accomplished by simply pushing the anode button and surrounding heat-softened glass upwardly into final position immediately following the controlled heating, and retaining the button in final position until the surrounding glass sets up. Thus, further deformation is avoided. However, the combined fabrication steps of forming the aperture, carefully inserting the button, pushing the sealed-in button upwardly into final position and holding the same in fixed relation during cooling all result in process delays which limit the speed and precision of high-quality manufacturing operations. Also, unless the button-glass heating and subsequent repositioning are very precisely controlled, some reentrancy can occur at the glass-metal interface which is extremely detrimental in the manufacture of high-quality electron-discharge tube devices.

Several prior art methods for sealing an anode button in the sidewall area of a tube funnel are disclosed in U.S. Patent Nos. 2,637,942 and 2,637,943 to Hinkley and Painter, respectively. Both of these patents disclose so-called anode button sealing machines which are adapted to moving a hollow funnel member on a horizontal rotary table through a series of working stations to effect fusion-sealing of an individual hollow frusto-conical shaped button in an intermediate area of the funnel sidewall. The Painter patent discloses a method of repositioning the anode button into final position by applying a vacuum bell over the button and surrounding glass to effect their upward movement by reduced pressure thereover. Such method has not been particularly effective in eliminating re-entrancy conditions which can and do occur at the glass-metal interface which cannot be tolerated even in small numbers in the manufacture of high-performance cathode-ray tube envelopes.

An improved method of repositioning such anode button in the tube sidewall has been disclosed in co-pending patent application Ser. No. 558,835 filed June 20, 1966, in the name of W. E. Wilburn, which application is assigned to the same assignee as the present application.

Accordingly, it is an object of this invention to provide an improved procedure for finally repositioning the anode button and surrounding glass to ensure proper seal contour at the glass-metal interface. The present invention, however, is directed to overcoming still further difficulties heretofore encountered in the mounting of a pin-type electrode element during the fabrication of the funnel member of a glass cathode-ray picture tube envelope.

Another object of this invention is to provide a method of expeditiously mounting a pin-type electrode in the sidewall of a hollow glass article such as the body portion of an all-glass television picture tube envelope.

Another object of this invention is to provide a method of sealing a metallic pin member in a sidewall of a hollow glass article having its ends projecting therebeyond and being free of deleterious glass from the sidewall for its connection to a high-voltage electrical circuit.

Another object of this invention is to provide a method of hermetically sealing a metallic pin-type electrode in the sidewall of an intermediate area of a hollow glass article, such electrode projecting therebeyond to conduct high-voltage electrical current therethrough, the method being especially applicable to the expeditious fabrication of low-cost articles such as smaller sizes of cathode-ray picture tubes for both monochromatic and polychromatic television reception.

A further object of this invention is to facilitate mounting a pre-oxidized metallic pin element in the sidewall of a hollow glass article without the necessity of providing a preformed aperture in the sidewall and without deleterious glass being disposed over projecting surfaces of the element in finally-disposed vacuum-tight relation.

The specific nature of this invention, as well as other objects and advantages thereof, will become apparent to those skilled in the art from the following detailed description taken in conjunction with the annexed sheets of drawings on which, by way of preferred example only, are illustrated one embodiment of the present invention.

Referring to the accompanying drawings:

FIG. 3 is an enlarged vertical sectional view of one portion of FIG. 2 showing the pin holder and receiver elements projecting axially through the centers of open-centered burners.

FIG. 4 is a vertical side view of the pin receiver element taken along the line 4—4 of FIG. 3.

Figure 1:
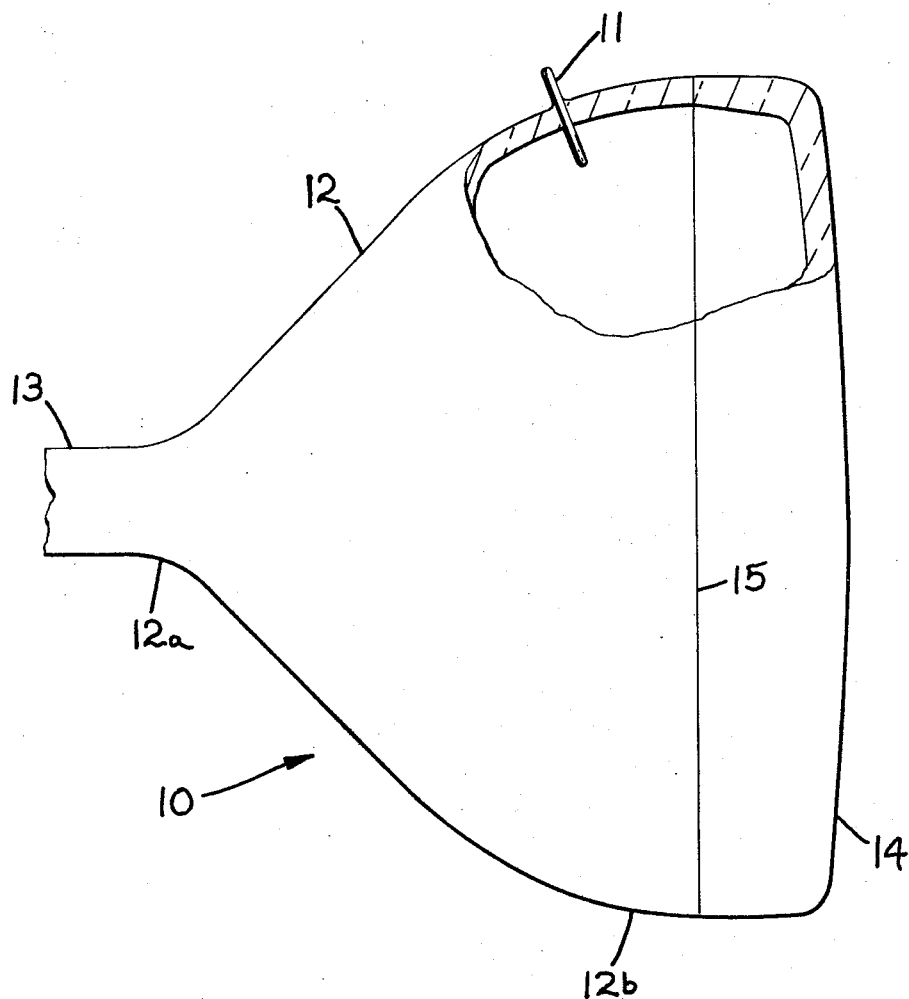
FIG. 1 is a side elevational view of a glass cathode-ray tube envelope fabricated in accordance with the present invention.

As shown in FIG. 1, a cathode-ray picture tube 10 is provided with a pin-type electrode 11 sealed into and projecting through the sidewall of its funnel portion 12 which is conventionally fabricated as a separate component part having either frusto-conical or frusto-pyramidal configuration. The smaller end 12a of funnel 12 is sealed to a neck tubulation 13 and the larger end 12b sealed to a light-transmitting faceplate 14 along an annular seal line 15. The sealing surfaces of the faceplate and funnel parts at seal line 15 are complementally contoured whether the faceplate be circular or rectangular in plan.

Pin electrode 11 is adapted to providing a conductive path for high-voltage electrical current between the interior and exterior surfaces of a television picture tube funnel. The pin electrode is preferably mounted or inserted in the glass sidewall by being forcefully driven through the glass and heat-sealed therein without any re-entrancy at the surfaces of the glass-to-metal interface. It is imperative that the interiorly and exteriorly projecting ends of the electrode be maintained free of adhering glass in order to permit positive connection thereto without interference with or disruption of the electrical circuit. The present method is fully capable of practice without objectionable glass adhering to the end portion of the electrode due to its being forcefully impelled through the glass sidewall under prescribed conditions.

Basically, the present method involves preheating the funnel member throughout its entirety to prevent heat-shock thereto during subsequent operations, locally heating a prescribed area of the funnel sidewall in which the pin electrode is to be mounted into heat-softened condition, allowing such prescribed area to cool briefly to form a skin on the glass surfaces, driving the pin through the localized sidewall, and then heating the glass-to-metal interface to ensure a durable seal and proper filleting of the glass at both interior and exterior surfaces while retaining the pin. Thus, the formation of the re-entrant angles which might result in leakage or destruction of the tube envelope when evacuated and placed under atmospheric loading is avoided.

Figure 2:
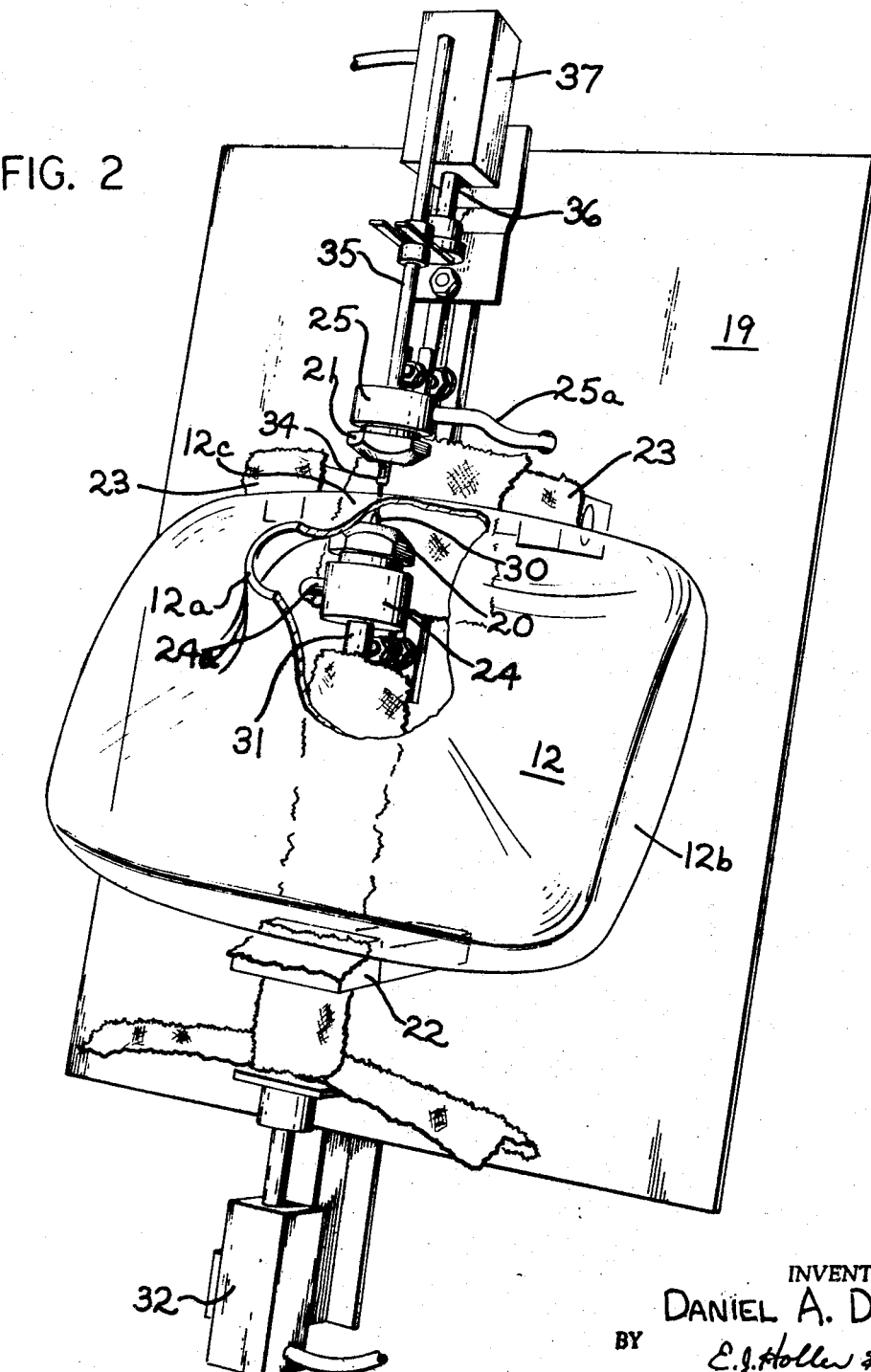
FIG. 2 is a side elevational view of the body or funnel member only of the tube envelope mounted on assembled apparatus for practicing the present invention.

The apparatus necessary for performing the prescribed method preferably involves the arrangement shown in FIG. 2. Two similar O-shaped burners 20 and 21 are mounted in face-to-face relation on an upright supporting base or fixture 19. A triangular array of heat-resistant positioning elements 22 and 23 is used to support funnel 12 with its localized sidewall area 12c disposed in horizontal relation.

Burners 20 and 21 are mounted in juxtaposed vertically-aligned relation suitably spaced to permit locating prescribed funnel sidewall area 12c therebetween. Burner support members 24 and 25 are employed to retain burners 20 and 21 respectively in fixed relation facing opposite surfaces of funnel sidewall area 12c. Fuel lines 24a and 25a are used to supply combustible fuel such as a gas-oxygen mixture to the burners. Each of the burners 20 and 21 has a central axially-aligned opening to permit the sealing operation to be conducted therethrough.

A pin holder 30 is mounted in vertical alignment with the opening in lower burner 20 adapted to move freely through both the burner nozzle and its support member 24. Pin holder 30 is mounted on the upper end of a rod 31 which interconnects with the piston of a fluid-actuated hydraulic cylinder 32. Thus, the stroke of the piston contained in cylinder 32 determines the distance of vertical travel of the pin 11. The pin is shown in both its retracted and elevated positions in FIG. 3. The pattern of burner fires 20a which emit in conical form from the series of inwardly-directed orifices of lower burner 20 around the pin is also shown in FIG. 3.

A receiver or stop member 34 is mounted in vertical alignment with the opening in upper burner 21. As shown in FIG. 2, receiver member 34 is supported by an upwardly-extending rod 35 which in turn is connected to the piston rod 36 of a fluid-actuated hydraulic cylinder 37. Thus, the travel of the piston of upper hydraulic cylinder 37 determines the vertical distance of travel of receiver member 34, this member being shown in its upper retracted and lower receiving positions in FIG. 3. Receiver member 34 is thus adapted to reciprocatable movement through the axial opening in upper burner 21 and its support member 25. FIG. 3 illustrates the downwardly-projecting cone-shaped pattern of burner fires 21a which are emitted by upper burner block 21.

The following detailed procedure is preferred to seal pin 11 in funnel member 12 in accordance with the present invention.

The funnel member is preheated in an oven to about 900° F. With the fires of burners 20 and 21 operating on pilot flame and prior to mounting the funnel on the fixture 19, pin 11 is inserted in pin holder 30 disposed in its lowermost retracted position. The funnel supporting elements 22 and 23 of the fixture are maintained in preheated condition to prevent thermal shock of the preheated funnel when removed from the oven and placed on the fixture.

Pin 11 is preferably comprised of No. 304 or Sylvania S–4 stainless steel rod having a preferred diameter of about $\frac{3}{32}$ inch. The diameter of the rod may be varied within rather wide limits, however, a cylindrical cross-section with chamfered ends is preferred. The pins are cleaned, degassed and their surfaces are pre-oxidized by an oxidation process such as that disclosed in U.S. Patent 2,933,423 issued Apr. 19, 1960, in order to obtain proper adherence of glass and metal surfaces.

The method employs two hollow-center gas-oxygen burners such as shown in FIGS. 2 and 3, the burner nozzle members 20 and 21 being removable to permit rapid change to obtain various fire patterns and fire angles. Burners mounted face to face heat both sides of the glass sidewall 12c simultaneously, localizing the heat in the small spot where the pin is to be inserted.

Following mounting of the funnel member on the supporting fixtures, burner fires 20a and 21a are ignited to concentrate their pinpoint flames on the localized sidewall area 12c selected for pin insertion. During this heating of the sidewall into workable condition, the pin 11 and receiver member 34 are maintained away from the glass in their retracted positions. The funnel is oriented on the fixture to precisely align the localized area for pin insertion with the pin holder and receiver members.

The stainless steel pin 11 connected to air or hydraulic cylinder 32 is made movable through the burner center opening, the burner body acting as a bearing and guide for the rod. Both burners are so fitted. The lower pin-holder 30 carries the pin, the upper receiver member having a larger opening for entrance of the pin end. Thus, both burners are mounted on an identical centerline and both the pin supporting and receiver are similarly aligned.

After controlled softening of the glass, the burner fires are cut back to pilot and the glass surfaces are allowed to cool in air to form a cooled skin condition. Receiver element 34 is brought into close proximity with the upper surface of the glass sidewall, preferably to within about $\frac{1}{64}$ inch of the glass surface as shown in FIG. 3. Cylinder 32 is operated to forcefully impel pin 11 through the glass sidewall 12c, the upper end of the pin penetrating the recess in the receiver. The receiver recess diameter is considerably larger than the pin diameter by as much as .040 inch. Lesser clearance is undesirable so that a small ring of glass carried by the projecting pin is passed into the half-open slot 34a of the receiver recess. Receiver 34 is then retracted upwardly and the burner fires are again re-ignited to deliver concentrated pinpoint flames onto the glass-to-metal interfaces. Pinholder 30 remains in its upper advanced position to firmly retain the pin until the sealing cycle is essetntially completed. Concentrated burner fires are maintained on both burners until the glass-to-metal seal is made. The burners are again cut back to pilot flame, permitting the glass to cool sufficiently to support the pin in fixed relation unaided by the pinholder. The pinholder is then retracted and the funnel member removed to an oven or lehr for annealing. The timing of the above-described cycle consumes less than one minute and preferably less than about 40 seconds for the entire cycle, during which the funnel is retained on the fixture. Timing of a representative cycle may be established as follows: heat-softening of the localized area, 5 seconds; allowing the skin of the sidewall to cool, 7 seconds; driving the pin through the sidewall, 1 second; sealing the pin in the sidewall by further heating, 10 seconds; and retaining the pin during cooling to set the glass, 15 seconds.

The starting positions of both the pin and back-up element during cycle initiation are inside the burners out of the fire path during initial heating of the glass sidewall and these members are therefore relatively cool. The step of cooling the glass skin prior to shooting the pin in combination with the construction of the receiver member produces an inserted pin which is free of glass, except in the sealed-in area.

The upper end of pinholder 30 is tapered so that sealing fires 20a will essentially clear the holder and impinge without obstruction directly on the pin and glass at the lower interface. The recess 34a in the receiver element is slightly larger than the pin employed to allow for slight angularity of the pin supported in the holder which may occur due to required clearances between the two. Also, the small angular contact ring on the lower extremity of the receiver element 34 chills a corresponding small ring of glass while the slotted intermediate portion of this element is momentarily hot enough to allow the pin to punch through the glass without adherence to either. The receiver element has a slot 34a cut across it which is slightly deeper than one-half the pin diameter. When the pin is shot through the glass, the small slug of glass driven into the receiver resides in this slot. After the punching cycle, however, such open slot is non-restrictive in allowing either the slug to fall out or be eliminated by the next succeeding slug.

Firing of the burners 20 and 21 as well as operation of hydraulic or air cylinders 32 and 37 is actuated by solenoid valves controlled through a multileaf timer to program all mechanical movements of the pinholder and receiver elements, as well as the burner fires.

Figure 6:
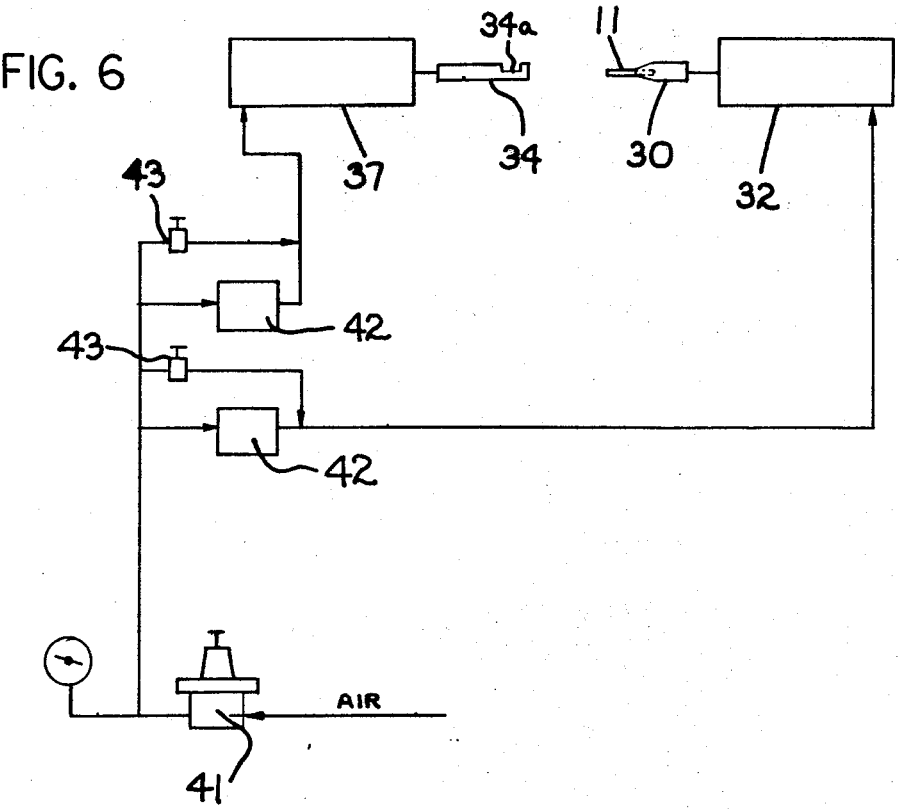
FIG. 6 is a schematic view of the pressurized-fluid control system for operation of the mechanical elements of the apparatus.
Figure 5:
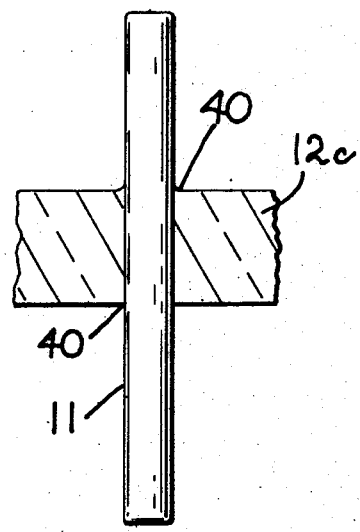
FIG. 5 is an enlarged vertical sectional view of a pin-type electrode sealed into the glass sidewall in final form.

FIG. 6 shows in schematic outline the various operative elements of the apparatus. Regulator 41 controls the flow of pressurized air or hydraulic fluid delivered to a pair of solenoid valves 42. Two manual push-button valves 43 are used to permit by-passing solenoid valves 42 and thus control the flow of pressurized fluid to the cylinders 32 and 37 each of which are the spring-return type. By-passing the solenoid valves is necessary to lower the pinholder out of the burner to permit loading the pin into the holder, and to manually advance the receiver 34 to permit setting the preferred 1/64 inch clearance between receiver and funnel surface.

The inserted pin is fully capable of serving as a high-voltage lead through the funnel sidewall. The strength of the pin to glass seal, using water submersion thermal shock, is completely adequate for the intended purposes. In test procedures of a limited number of test samples, none failed in the seal area. Standard wet immersion thermal shock tests were conducted on ten sample funnels in each of which one conventional anode button and one pin seal were incorporated. Tests were made at 130°, 140° and 150° F. thermal differential levels with no failures occurring in the glass-metal seals. The seals were considered to be of high quality and fully capable of withstanding atmospheric loading.

I claim:
1. The method of hermetically sealing a metallic pin member projecting in transverse relation through the sidewall of a glass article comprising the steps of:
   preheating the glass article to an elevated temperature substantially below its deformation point temperature,
   additionally heating a localized area of the article sidewall into heat-softened workable condition utilizing juxtaposed heat sources directed at opposing surfaces thereof,
   discontinuing the additional heating and allowing the juxtaposed surfaces of said localized area to cool sufficiently to form a cooled-skin condition,
   forcefully impelling a metallic pin member completely through the localized area of the article sidewall against an adjacent receiver member, the ends of said pin being substantially free of glass from the sidewall adhering thereto,
   retaining said pin member in aligned relation during further heating of the glass-to-metal-interfaces at both juxtaposed surfaces of said localized area, and
   allowing said localized area and pin member to cool during continued retention of said pin member.

2. The method in accordance with claim 1, wherein the juxtaposed heated surfaces of said localized area are allowed to cool for a period not in excess of 10 seconds prior to forcefully impelling said pin member through said glass sidewall.

3. The method in accordance with claim 1, wherein the step of reheating of the glass-metal interfaces on the opposing surfaces subsequent to pin insertion effects filleting of the glass thereat.

4. The method in accordance with claim 1, including the step of pre-oxidizing the surfaces of said pin member comprised of stainless steel prior to its being forcefully impelled through the glass sidewall.

5. The method in accordance with claim 1, including the step of moving said receiver member into proximity with said article sidewall and impelling said pin member through the article sidewall by a pair of fluid-actuated motors operable in timed relation immediately subsequent to heat-softening and surface cooling said localized area.

6. The method of hermetically sealing a metallic pin-type electrode member in the sidewall of a hollow glass article projecting therebeyond to conduct high-voltage electrical current therethrough comprising the steps of:
   preheating the glass article to an elevated temperature substantially less than its deformation point temperature,
   additionally heating a localized area of the article sidewall into heat-softened workable condition employing a fixed pair of juxtaposed heat sources disposed closed closely adjacent said sidewall,
   discontinuing said additional heating and allowing the juxtaposed surfaces of said localized area to cool sufficiently to form a cooled-skin condition,
   moving a movable receiver member having a recessed cavity into proximity with one surface of said localized area,
   forcefully impelling a metallic pre-oxidized stainless steel pin member while being positively retained completely through the sidewall of said localized area into engagement with the aligned recessed cavity of said receiver member, the ends of said pin being substantially free of glass from the sidewall adhering thereto,
   retaining said pin member in aligned relation with at least one end supported during further supplemental heating of the glass-to-metal interfaces at both juxtaposed surfaces of said localized area, and allowing said localized area and pin member to cool during continued retention of said pin member.

References Cited

UNITED STATES PATENTS

| | | | |
|---|---|---|---|
| 1,487,288 | 3/1924 | Thronsen | 65—139 |
| 2,215,641 | 9/1940 | Freeman | 65—155 |
| 2,288,537 | 6/1942 | Malloy | 65—154 |
| 2,803,926 | 8/1957 | Ekkers | 65—59 |
| 3,021,643 | 2/1962 | Blanding | 65—155 |

FOREIGN PATENTS 790,234  2/1958  Great Britain.

S. LEON BASHORE, Primary Examiner
S. R. FRIEDMAN, Assistant Examiner

U.S. Cl. X.R.

65—154, 155